(12) United States Patent  
Perelli et al.

(10) Patent No.: US 9,946,308 B1  
(45) Date of Patent: Apr. 17, 2018

(54) ELECTRONIC APPARATUS WITH INTEGRATED STAND

(71) Applicant: Lenovo (Singapore) Pte. Ltd., New Tech Park (SG)

(72) Inventors: Thomas Perelli, Raleigh, NC (US); Ali Kathryn Ent, Raleigh, NC (US); Cuong Huy Truong, Cary, NC (US)

(73) Assignee: LENOVO (SINGAPORE) PTE. LTD, New Tech Park (SG)

( * ) Notice: Subject to any disclaimer, the term of this patent is extended or adjusted under 35 U.S.C. 154(b) by 0 days.

(21) Appl. No.: 15/295,344

(22) Filed: Oct. 17, 2016

(51) Int. Cl.
  *H05K 7/00* (2006.01)
  *H05K 5/00* (2006.01)
  *G06F 1/16* (2006.01)

(52) U.S. Cl.
  CPC ............ *G06F 1/166* (2013.01); *G06F 1/1616* (2013.01); *G06F 1/1643* (2013.01); *G06F 1/1647* (2013.01); *G06F 1/1654* (2013.01)

(58) Field of Classification Search
  CPC ......................................................... H05K 5/00
  USPC .................................................... 361/679.01
  See application file for complete search history.

(56) References Cited

U.S. PATENT DOCUMENTS

| | | | |
|---|---|---|---|
| 6,341,061 | B1 | 1/2002 | Eisbach et al. |
| 7,259,750 | B2 | 8/2007 | Ghosh et al. |
| 2002/0024499 | A1 | 2/2002 | Karidis et al. |
| 2006/0034042 | A1 | 2/2006 | Hisano et al. |
| 2010/0142139 | A1 | 6/2010 | Szabolcsi et al. |
| 2012/0194448 | A1* | 8/2012 | Rothkopf ............ A45C 13/002 345/173 |
| 2013/0321340 | A1 | 12/2013 | Seo et al. |
| 2016/0316872 | A1 | 11/2016 | Huang et al. |
| 2017/0090522 | A1 | 3/2017 | Lu et al. |
| 2017/0090523 | A1 | 3/2017 | Tazbaz et al. |
| 2017/0220215 | A1 | 8/2017 | Wu et al. |

* cited by examiner

*Primary Examiner* — Jerry Wu  
(74) *Attorney, Agent, or Firm* — Dean D. Small; The Small Patent Law Group, LLC (57) ABSTRACT

Electronic apparatuses and electronic subassemblies having integrated stands are provided. An electronic subassembly includes a display device and a housing coupled with the display device. The housing has an integrated stand that encircles an open area and that projects away from the display device. The electronic subassembly also includes a processor disposed in the housing and that controls information displayed on the first display device. The integrated stand pivots relative to the housing and supports the housing at different angles relative to a surface on which the housing is disposed. Another electronic subassembly may be removably coupled with the electronic subassembly having the integrated stand.

12 Claims, 5 Drawing Sheets

ELECTRONIC APPARATUS WITH INTEGRATED STAND

BACKGROUND

Embodiments of the present disclosure generally relate to electronic apparatuses and more particularly to electronic apparatuses having stands integrated into the apparatuses.

A wide variety of electronic apparatuses are offered today. Examples of electronic apparatuses include computers (e.g., tablet computers), electronic games, touchscreens, and the like. Some of these apparatuses may be handheld apparatuses that can be attached to separate stands to allow the apparatuses to be oriented at an angle above a surface on which the stand and apparatus rest.

These separate stands add size and weight to the apparatuses, and can add undesirable bulk to the appearance of the apparatuses. Additionally, these stands can take up additional storage space in bags or other containers used to hold the apparatuses.

Some separate stands may be thinner and flexible to reduce the size and weight added to the apparatuses. But, these flexible stands are limited in their ability to hold the apparatuses upright.

SUMMARY

In accordance with embodiments herein, electronic apparatuses and electronic subassemblies having integrated stands are provided. In one embodiment, an electronic subassembly includes a first display device, a first housing coupled with the first display device, and a processor disposed in the first housing and controlling information displayed on the first display device. The first housing has an integrated stand that encircles an open area and that projects away from the first display device. The integrated stand pivots relative to the first housing and supports the first housing at different angles relative to a surface on which the first housing is disposed.

In one embodiment, an electronic apparatus includes a first housing having a first display device, a first input device, and a processor, and a second housing coupled with the first housing and having a second display device. The processor in the first housing controls information displayed on the first display device and on the second display device. The first housing is separable from the second housing with the processor controlling the information displayed on the first display device subsequent to separating the first housing from the second housing.

In one embodiment, a method includes coupling a first display device with a first housing having a pivoting integrated stand that encircles an open area and that projects away from the first display device, and coupling the first display device with a processor disposed in the first housing. The integrated stand pivots relative to the first housing and supports the first housing at different angles relative to a surface on which the first housing is disposed.

DETAILED DESCRIPTION

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Figure 1:
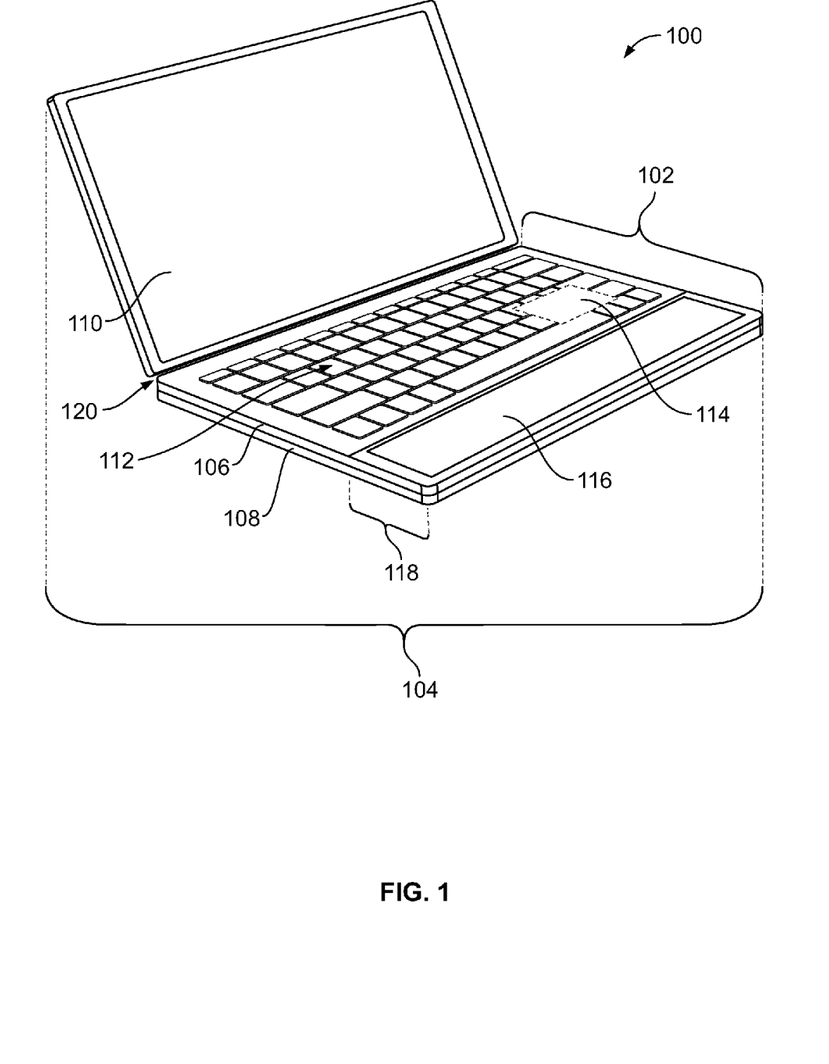
FIG. 1 illustrates a perspective view of an electronic apparatus in a combined state and formed in accordance with an embodiment described herein.
Figure 2:
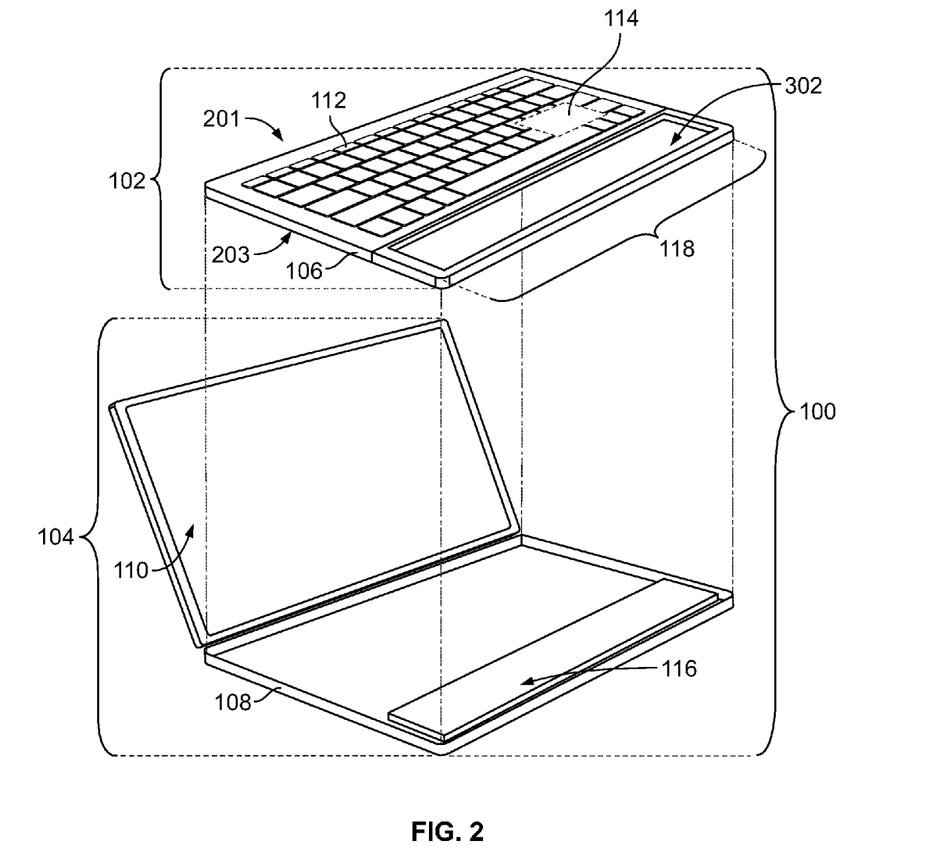
FIG. 2 illustrates a perspective view of the electronic apparatus shown in FIG. 1 in a partially separated state and formed in accordance with an embodiment described herein.

FIG. 1 illustrates a perspective view of an electronic apparatus 100 in a combined state and formed in accordance with an embodiment described herein. FIG. 2 illustrates a perspective view of the electronic apparatus 100 in a separated state in accordance with the embodiment shown in FIG. 1. The apparatus 100 includes first and second electronic subassemblies 102, 104 that are coupled with each other in the combined state of the electronic apparatus 100 shown in FIG. 1. As described herein, the subassembly 102 can be separated from the subassembly 104 in a separated state of the apparatus 100.

The first electronic subassembly 102 includes a housing 106 to which a first input device 112 is engaged. The housing 106 has an input side 201 and an opposite display side 203 (shown in FIG. 2). The first input device 112 is shown as a keyboard having keys that are accessible on the input side 201 of the housing 106. Optionally, the input device 112 may be another type of input device.

A processor 114 is disposed within the housing 106 of the electronic subassembly 102. The processor 114 can include a microprocessor, field programmable gate arrays, or an integrated circuit. The processor 114 operates to control operations of the electronic apparatus 100 in the combined state and may control operations of the first electronic subassembly 102 in the separated state. For example, the electronic apparatus 100 can operate as a laptop computer with the processor 114 controlling operation of the apparatus 100 when the first and second electronic subassemblies 102, 104 are combined or connected to form the electronic apparatus 100.

The input device 112 may be coupled with the processor 114 so that user input provided by the input device 112 is communicated to the processor 114 by one or more wired connections. The first electronic subassembly 102 may operate as a tablet computer with the processor 114 controlling operation of the first electronic subassembly 102 when the subassemblies 102, 104 are separated from each other.

The housing 106 includes an integrated stand 118 formed from the housing 106. The stand 118 may be integral to the housing 106 in that the stand 118 is part of the housing 106, and cannot be separated from the housing 106 without destroying or otherwise breaking the housing 106. As described below, the stand 118 may be used to support the first electronic subassembly 102 in the separated state during operation of the first electronic subassembly 102.

The second electronic subassembly 104 includes a housing 108 that forms at least part of the external surface of the second electronic subassembly 104. As shown in FIG. 2, a portion of the housing 108 of the second electronic subassembly 104 is beneath the housing 106 of the first electronic subassembly 102 when the subassemblies 102, 104 are in the combined state to form the electronic apparatus 100. A display device 110 is disposed in or otherwise coupled with the housing 108. This display device 110 may be an electronic display, such as a touchscreen, liquid crystal display, or the like. The housing 108 of the second electronic subassembly 104 may hold batteries or other power sources for powering the processor 114 and/or a display device (shown and described below) of the first electronic subassembly 104 while the apparatus 100 is in the combined state.

The housing 108 of the second electronic subassembly 104 includes a pivot interface 120 in the illustrated embodiment. This interface 120 may be formed by one or more devices, such as a hinge, that allow the display device 110 of the second electronic subassembly 104 and/or the first electronic subassembly 102 to pivot relative to each other.

The information shown on the display device 110 may be controlled by the processor 114 when the electronic apparatus 100 is in the combined state. For example, the subassemblies 102, 104 may be connected with each other by seating the subassembly 102 into the subassembly 104. Optionally, the processor 114 may be wirelessly connected with the display device 110 to allow the processor 114 to control the information presented on the display device 110. The interface 120 can represent a hinge or pivot line between the subassemblies 102, 104 that allows the subassemblies 102, 104 to pivot relative to each other. This can permit the apparatus 100 to open or close in a clamshell-like manner about or around the interface 120 when the subassemblies 102, 104 are coupled with each other.

The housing 108 includes an input device 116. The input device 116 can be a touch sensitive device, such as a touch sensitive area of the housing 108. In the illustrated embodiment, the stand 118 of the housing 106 of the first electronic subassembly 102 encircles the second input device 116 such that the stand 118 frames or forms a frame around the second input device 116, as shown in FIG. 1. The stand 118 encircles an open area 302 (shown in FIG. 2) in which the input device 116 is disposed in the combined state of the electronic apparatus 100.

The first electronic subassembly 102 is detached from the housing 108 of the second electronic subassembly 104 to transition the electronic apparatus 100 from the combined state to the separated state shown in FIG. 2. The first electronic subassembly 102 also includes a display device (not visible in FIG. 2) that is on the display side 203 of the housing 106 of the first electronic subassembly 102. This display device may be an electronic display, such as a touchscreen, liquid crystal display, or the like. The processor 114 may control the information that is presented on the display device on the display side 203 of the housing 106.

In one embodiment, the second electronic subassembly 104 may only operate to display information on the display device 110 while the second electronic subassembly 104 is coupled with the first electronic subassembly 102. Alternatively, the second electronic subassembly 104 may include a processor similar or identical to the processor 114 in the housing 108 to allow for the display device 110 of the second electronic subassembly 104 to continue operating while the first and second electronic subassemblies 102, 104 are separated from each other.

Figure 3:
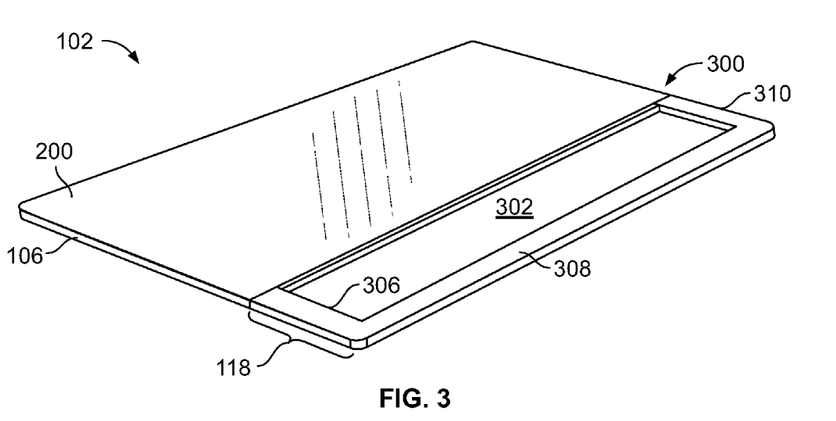
FIG. 3 illustrates a perspective view of an electronic subassembly shown in FIG. 2 in a separated state and formed in accordance with an embodiment described herein.

FIG. 3 illustrates a perspective view of the display side 203 of the first electronic subassembly 102 in a separated state and formed in accordance with an embodiment described herein. The first and second electronic subassemblies 102, 104 (shown in FIGS. 1 and 2) are separated from each other to transition from the combined state (shown in FIG. 1) to the separated state shown in FIG. 3. Separation of the first electronic subassembly 102 results in the input device 116 (shown in FIGS. 1 and 2) no longer being disposed within or framed by the integrated stand 118 of the housing 106 of the first electronic subassembly 102. Although not visible in FIG. 3, the input device 112 (shown in FIG. 1) may remain coupled or part of the first electronic subassembly 102 on the input side 201 (shown in FIG. 2) that is opposite of the illustrated display side 203.

The first electronic subassembly 102 includes a display device 200 on the display side 203 of the housing 106. The display device 200 may be similar to the display device 110. For example, the display device 200 may be an electronic display, such as a touchscreen, liquid crystal display, or the like.

The integrated stand 118 outwardly projects from the remainder of the housing 106 that holds or is coupled with the display device 200. For example, the first electronic subassembly 102 may be a planar or substantially planar device in that the outer or longest dimensions of the first electronic subassembly 102 along first and second orthogonal or perpendicular directions are longer than the outer or longest dimension of the first electronic subassembly 102 along a third orthogonal or perpendicular direction. The integrated stand 118 may project outward from the remainder of the housing 106 and away from the display device 200 along the first and/or second orthogonal or perpendicular directions.

The integrated stand 118 is formed from side members 306, 310 connected with each other by a connecting member 308. The members 306, 308, 310 form part of the housing 106 and may be solid bodies connected with each other to encircle the open area 302. The open area 302 may be sized to receive the input device 116, as shown in FIG. 1. For example, the members 306, 308, 310 may extend along three sides of the outer perimeter of the input device 116, with the remainder of the housing 106 extending along a fourth side of the outer perimeter of the input device 116.

The integrated stand 118 may be used to support the first electronic subassembly 102 in one or more positions for use by an operator. In one example, the stand 118 may be placed onto a projection outwardly extending from a vertical or predominantly vertical surface, such as one or more hooks outwardly extending from a wall. The stand 118 may be placed around the projection to cause the projection to extend through and engage one or more of the members 306, 308, 310 through the open area 302. The first electronic subassembly 102 may then operate as a tablet computer or other device hanging from the projection or projections. As another example, the stand 118 may be used as a handle for an operator to grasp and carry the first electronic subassembly 102. The operator may grasp one or more of the members 306, 308, 310 with one or more fingers of the operator extending into or through the open area 302 to allow the operator to carry the first electronic subassembly 102.

Optionally, the stand 118 may be connected with the remainder of the housing 106 by a hinged or pivoting interface 300. The members 306, 310 may pivot relative to the remainder of the housing 106 and the display device 200 to a variety of positions to support the display device 200 at a variety of different angles relative to a surface on which the first electronic subassembly 102 rests.

Figure 4:
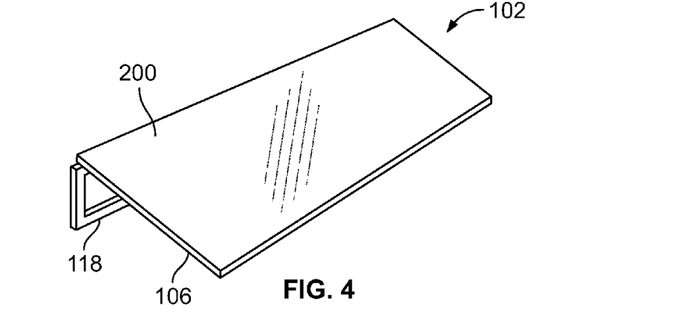
FIG. 4 illustrates a perspective view of the electronic subassembly shown in FIG. 2 with an integrated stand shown in FIG. 1 in a first hinged position relative to a display device according to one embodiment.

FIG. 4 illustrates a perspective view of the first electronic subassembly 102 with the integrated stand 118 in a first hinged position relative to the display device 200 according to one embodiment. The stand 118 may pivot relative to the remainder of the housing 106 of the first electronic subassembly 102 to support the display device 200 at an acute angle with respect to a surface on which the member 308 of the stand 118 and the opposite edge of the housing 106 rests. This allows for the display device 200 to be at a slight incline to allow an operator to more easily provide touch input to the processor 114 (shown in FIG. 1) via the display device 200.

Figure 5:
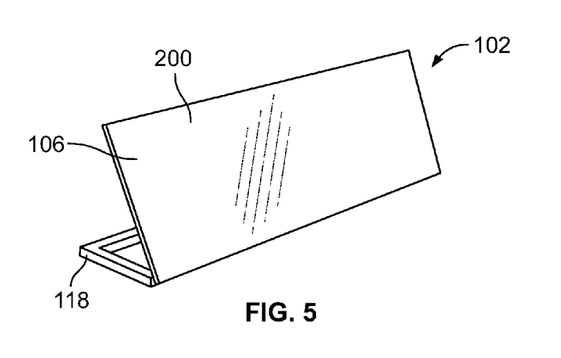
FIG. 5 illustrates a perspective view of the electronic subassembly shown in FIG. 2 with the integrated stand in a second hinged position relative to the display device according to one embodiment.

FIG. 5 illustrates a perspective view of the first electronic subassembly 102 with the integrated stand 118 in a second hinged position relative to the display device 200 according to one embodiment. The stand 118 may pivot relative to the remainder of the housing 106 of the first electronic subassembly 102 to support the display device 200 at a larger acute angle with respect to a surface on which the member 308 of the stand 118 and the opposite edge of the housing 106 rests. As shown in FIG. 5, this allows for the display device 200 to be at a more upright orientation (e.g., closer to a vertical orientation relative to the orientation shown in FIG. 4).

Figure 6:
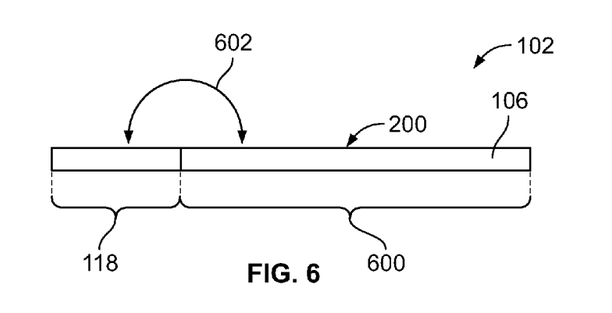
FIG. 6 illustrates a side view of the electronic subassembly shown in FIG. 2 with the integrated stand oriented at an angle of 180 degrees to the display device.

FIGS. 6 through 9 illustrate side views of additional positions of the integrated stand 118 relative to the remainder of the housing 106 of the first electronic subassembly 102 according to various embodiments. FIG. 6 illustrates a side view of the first electronic subassembly 102 with the stand 118 oriented at an angle 602 of 180 degrees to the display device 200 and the remainder of the housing 106. This can be the position of the stand 118 as shown in FIGS. 1 through 4 to allow the electronic subassembly 102 to lie flat on a surface or to be hung from a projection extending from a wall or other vertical (or predominantly vertical) surface.

Figure 7:
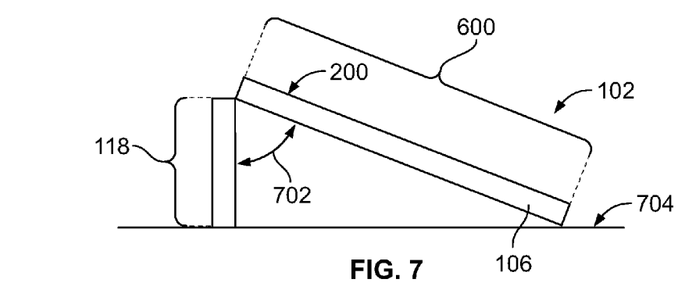
FIG. 7 illustrates a side view of the electronic subassembly shown in FIG. 2 with the integrated stand oriented at an acute angle to the display device.

FIG. 7 illustrates a side view of the first electronic subassembly 102 with the stand 118 oriented at an acute angle 702 to the display device 200 and the remainder of the housing 106. The angle 702 can be forty-five degrees or less. This position of the stand 118 can be the same as the position shown in FIG. 4.

Figure 8:
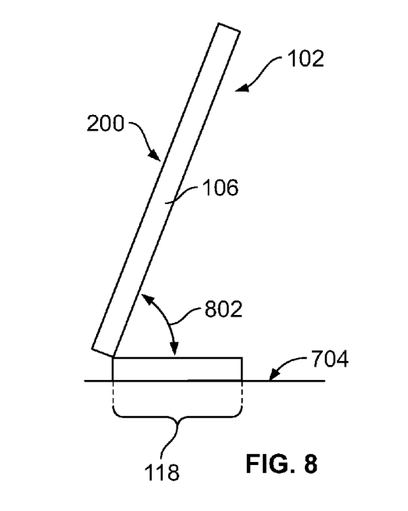
FIG. 8 illustrates a side view of the electronic subassembly shown in FIG. 2 with the integrated stand oriented at another, different acute angle to the display device.

FIG. 8 illustrates a side view of the first electronic subassembly 102 with the stand 118 oriented at another, different acute angle 802 to the display device 200 and the remainder of the housing 106. The angle 802 can be forty-five degrees or less. This position of the stand 118 can be the same as the position shown in FIG. 5 to provide for a more upright orientation of the display device 200 relative to a surface 704 on which the first electronic subassembly 102 sits.

Figure 9:
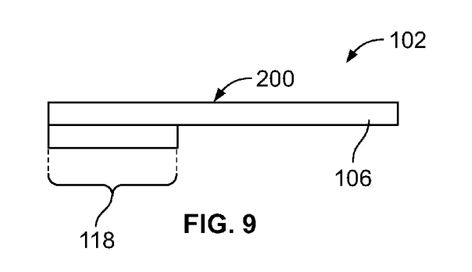
FIG. 9 illustrates a side view of the electronic subassembly shown in FIG. 2 with the integrated stand oriented at an obtuse angle to the display device.

FIG. 9 illustrates a side view of the first electronic subassembly 102 with the stand 118 oriented at an obtuse angle to the display device 200 and the remainder of the housing 106. The stand 118 can be flipped back such that the stand 118 extends along a back side of the display device 200 along the housing 106. This orientation can allow for the stand 118 to be out of the sight of the operator, which may be desired when the operator is using the first electronic subassembly 102 as a tablet computer.

FIGS. 4 through 9 illustrate some, but not all, of the orientations that the integrated stand 118 may be relative to the remainder of the housing 106 and/or the display device 200. The stand 118 may pivot and be held in position (e.g., through a friction fit or other securing feature with the remainder of the housing 106 at the interface 300) at a variety of different angles to allow an operator a wide range of choices for the orientation of the display device 200.

Figure 10:
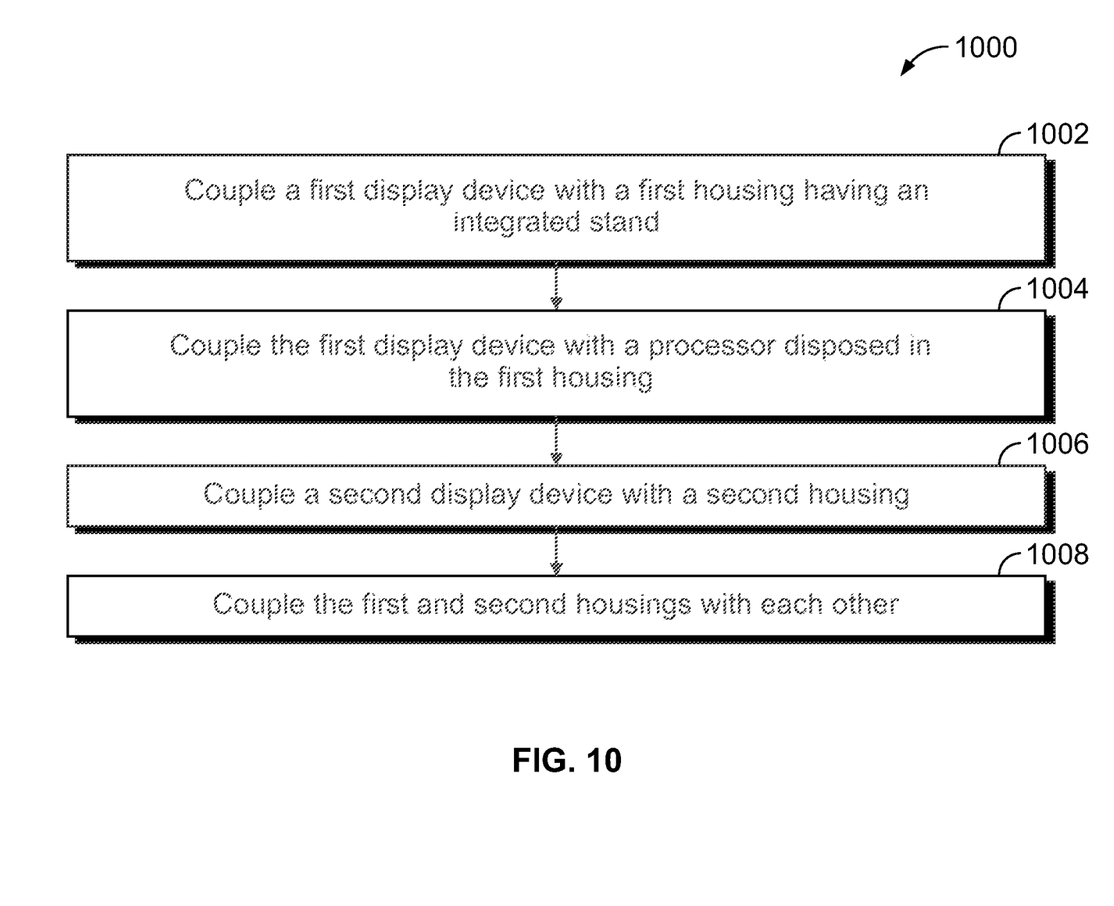
FIG. 10 illustrates a flowchart of one embodiment of a method for providing an electronic apparatus with an integrated stand.

FIG. 10 illustrates a flowchart of one embodiment of a method 1000 for providing an electronic apparatus with an integrated stand. The method 1000 may be used to manufacture or assemble the electronic apparatus 100 described herein. Optionally, fewer operations of the method 1000 may be performed to manufacture or assemble the first electronic subassembly 102 without manufacturing or assembling the entire electronic apparatus 100.

At 1002, a first display device is coupled with a first housing having an integrated stand. For example, the display device 200 can be connected with or otherwise disposed in the housing 106 having the integrated stand 118. The housing 106 may have a recess that receives the display device 200. At 1004, the first display device is coupled with a processor disposed in the first housing. The display device 200 can be conductively coupled with the processor 114 to allow the processor 114 to control information presented on the display device 200 and/or to allow the processor 114 to receive input from the display device 200 (e.g., via sensed touches on the display device 200 by an operator). The display device 200 may be coupled with the processor 114 prior to, subsequent to, or concurrent with coupling the display device 200 with the housing 106.

At 1006, a second display device is coupled with a second housing. For example, the display device 110 may be connected with or otherwise disposed in the housing 108. The housing 108 may have a recess or side that receives the display device 110, similar to the housing 106. The second display device may be coupled with the processor in the first housing, such as by coupling the first housing with the second housing and the first and second housings including contacts that form at least part of a conductive pathway between the processor and the second display device.

At 1008, the first and second housings are coupled with each other. The first housing of the first electronic subassembly may be placed onto a portion of the second housing of the second electronic subassembly such that the integrated stand of the first electronic subassembly extends around at least part of an input device in the second electronic subassembly. For example, the stand 118 of the first electronic subassembly 102 may be placed around the input device 116 with the display 200 of the first electronic subassembly 102 facing the housing 108 of the second electronic subassembly 104, as shown in FIG. 1. This combines the first and second electronic subassemblies to form the electronic apparatus.

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code embodied on a storage medium may be transmitted using any appropriate medium, including but not limited to, wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

Although illustrative example embodiments have been described herein with reference to the accompanying figures, it is to be understood that this description is not limiting and that various other changes and modifications may be affected therein by one skilled in the art without departing from the scope or spirit of the disclosure.

The modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. An electronic subassembly comprising:
    a first display device;
    a first housing coupled with the first display device, the first housing having an integrated stand that is inseparable from the first housing, that encircles an open area, and that projects away from the first display device;

one or more processors disposed in the first housing that control information displayed on the first display device, wherein the integrated stand pivots relative to the first housing and supports the first housing at different angles relative to a surface on which the first housing is disposed;

a first input device located on an input side of the first housing that is opposite of a display side housing the first display device; and a second electronic apparatus having a second display device and a second housing with a second input device joined together by a hinge interface, wherein the first display device faces the second housing and the second input device is exposed to the user through the open area while the first housing is coupled with the second housing.

2. The electronic subassembly of claim 1, wherein the first display device includes a touch sensitive screen.

3. An apparatus comprising:

a first housing having a first display device, a first input device, and one or more processors, the first display device and the first input device located on opposite sides of the first housing; and a second housing coupled with the first housing and having a second display device, wherein the one or more processors in the first housing control information displayed on the first display device and on the second display device, wherein the first housing is separable from the second housing and the one or more processors control the information displayed on the first display device subsequent to separating the first housing from the second housing;

the first housing includes an integrated stand that is inseparable from the first housing, that encircles an open area, and that projects away from the first display device, a second input device disposed within the open area encircled by the integrated stand of the first housing with the first input device and the second input device facing a common direction while the second housing is coupled with the first housing.

4. The apparatus of claim 3, wherein the first input device includes a keyboard and the second input device includes a touch sensitive device.

5. The apparatus of claim 3, wherein the integrated stand of the first housing pivots relative to the first display device.

6. The apparatus of claim 3, wherein the integrated stand pivots between different positions relative to the first housing and supports the first housing at different angles relative to a surface on which the first housing is disposed.

7. The apparatus of claim 3, wherein the first input device and the first display device are disposed on opposite sides of the first housing.

8. The apparatus of claim 3, wherein the first input device includes a keyboard.

9. The apparatus of claim 3, wherein the second housing pivots in a location between the second display device and a portion of the second housing that couples with the first housing.

10. The apparatus of claim 3, wherein the first display device includes a touch sensitive screen.

11. A method comprising:

coupling a first display device with a first housing having a pivoting integrated stand that is inseparable from the first housing, that encircles an open area, and that projects away from the first display device;

coupling the first display device with a processor disposed in the first housing, wherein the integrated stand pivots relative to the first housing and supports the first housing at different angles relative to a surface on which the first housing is disposed; and coupling the first housing with a second housing of a second electronic apparatus having a second display device; and the first housing is coupled with the second housing such that a second input device of the second housing is disposed within the open area of the integrated stand of the first housing with the first input device and the second input device facing a common direction while the first housing is coupled with the second housing.

12. The method of claim 11, wherein the first display device is coupled with the processor in the first housing and the first housing is coupled with the second housing such that the processors controls information displayed on the first display device and information displayed on the second display device.

* * * * *